(12) United States Patent
Chitrala et al.

(10) Patent No.: US 11,781,798 B2
(45) Date of Patent: Oct. 10, 2023

(54) VIBRATION DAMPING CLIPS FOR CLIMATE CONTROL SYSTEMS

(71) Applicant: Trane International Inc., Davidson, NC (US)

(72) Inventors: Arvind Chitrala, Tyler, TX (US); Don A. Schuster, Lindale, TX (US); Thomas Reed, Whitehouse, TX (US); Percy F. Wang, Tyler, TX (US)

(73) Assignee: TRANE INTERNATIONAL INC., Davidson, NC (US)

( * ) Notice: Subject to any disclaimer, the term of this patent is extended or adjusted under 35 U.S.C. 154(b) by 687 days.

(21) Appl. No.: 16/792,609

(22) Filed: Feb. 17, 2020

(65) Prior Publication Data

US 2021/0254882 A1    Aug. 19, 2021

(51) Int. Cl.
| | |
|---|---|
| F25B 13/00 | (2006.01) |
| F25B 41/20 | (2021.01) |
| F04B 39/00 | (2006.01) |
| F04D 29/60 | (2006.01) |
| F04D 29/66 | (2006.01) |
| F25B 17/00 | (2006.01) |
| F25D 23/00 | (2006.01) |
| F16K 47/00 | (2006.01) |
| F16F 7/00 | (2006.01) |

(52) U.S. Cl.
CPC ........ *F25D 23/006* (2013.01); *F04B 39/0027* (2013.01); *F04B 39/0044* (2013.01); *F04D 29/60* (2013.01); *F04D 29/66* (2013.01); *F04D 29/668* (2013.01); *F16F 7/00* (2013.01); *F16K 47/01* (2021.08); *F25B 13/00* (2013.01); *F25B 17/00* (2013.01); *F25B 41/20* (2021.01); *F04B 2201/0802* (2013.01); *F04C 2270/12* (2013.01); *F16F 2230/22* (2013.01)

(58) Field of Classification Search
CPC ........ F04D 29/667; F04D 25/06; F25B 41/40; F25B 2500/13
USPC ..................................................... 62/295, 296
See application file for complete search history.

(56) References Cited

U.S. PATENT DOCUMENTS

2014/0345310 A1* 11/2014 Tamaki ................... F25B 41/39
                                                                        62/238.6

FOREIGN PATENT DOCUMENTS

| | | | | |
|---|---|---|---|---|
| CN | 203641685 U | 6/2014 | | |
| CN | 104534171 A | 4/2015 | | |
| CN | 205136834 U | 4/2016 | | |
| CN | 206889865 U | 1/2018 | | |
| CN | 207945356 U | * 10/2018 | | |
| CN | 208651816 U | 3/2019 | | |
| EP | 1843110 A2 | * 10/2007 | ............ | F25B 41/003 |
| JP | H08233436 A | * 9/1996 | ........... | F25D 23/003 |
| JP | 2008002740 A | 1/2008 | | |
| KR | 20180068749 A | 6/2018 | | |

* cited by examiner

*Primary Examiner* — Philip E Stimpert
(74) *Attorney, Agent, or Firm* — WOMBLE BOND DICKINSON (US) LLP

(57) ABSTRACT

Embodiments of vibration damping clips for use within a climate control system are disclosed. In an embodiment, a vibration damping clip is engaged with three fluid lines of an outdoor unit of the climate control system, such as, for instance, a suction line of a compressor of the climate control system, a discharge line of the compressor, and a fluid line coupled to a pressure equalization valve (PEV) within the outdoor unit.

17 Claims, 12 Drawing Sheets

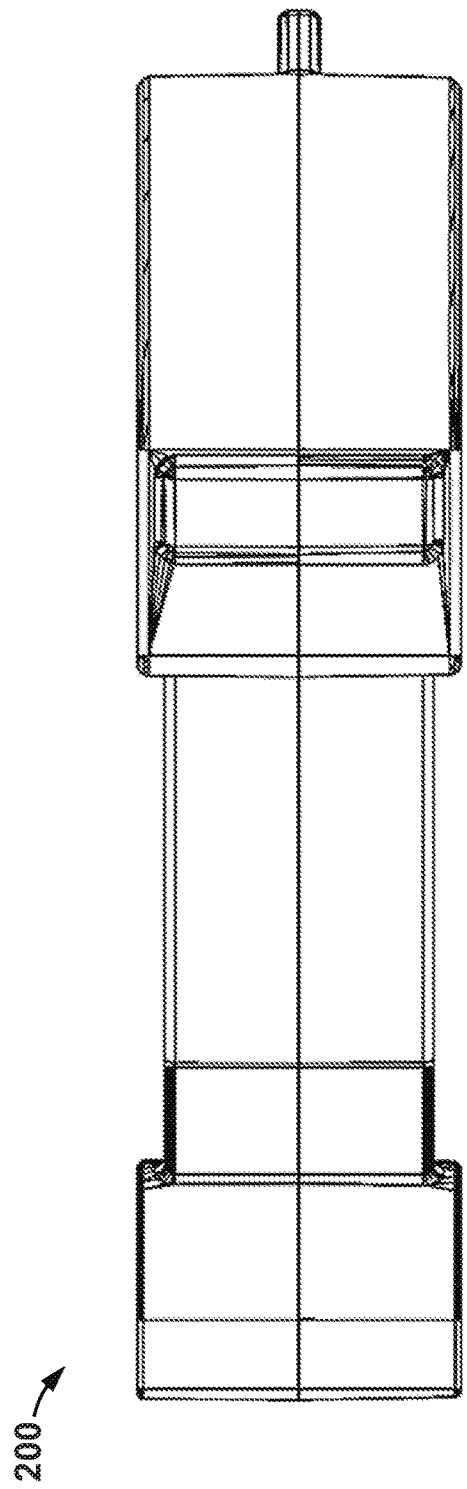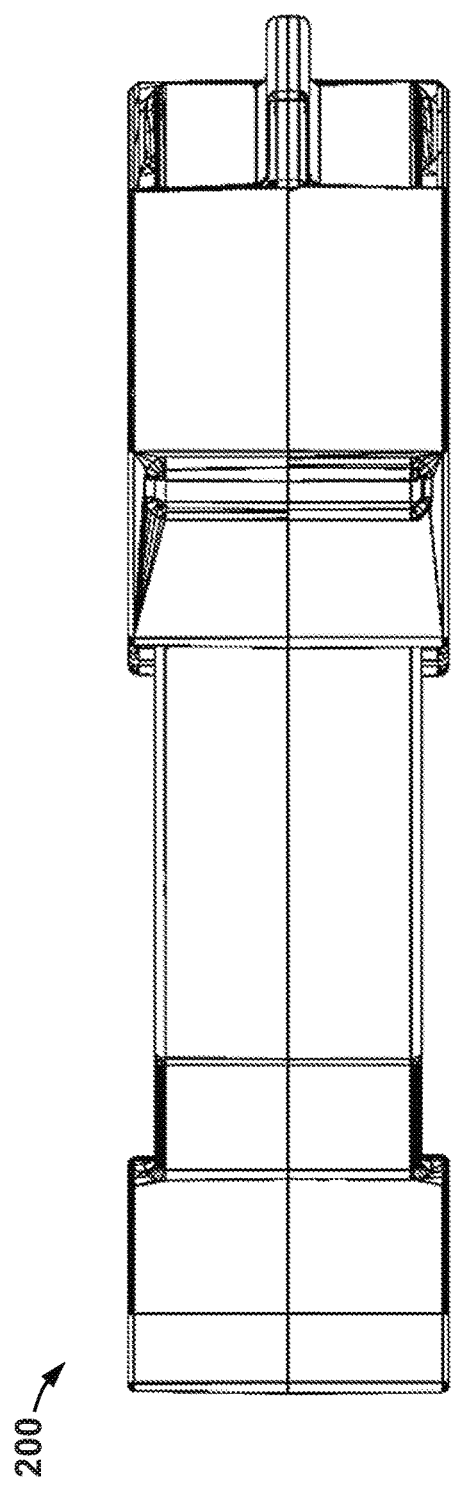

VIBRATION DAMPING CLIPS FOR CLIMATE CONTROL SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A climate control system (e.g., a heating, ventilation, and air conditioning (HVAC) system, dehumidification system, stand-alone air conditioning system, etc.) may circulate a refrigerant through a fluid loop so as to exchange heat between an indoor space (e.g., a house, office, commercial store, etc.) and an outer environment surrounding the indoor space. During these operations, the compression and flow of the refrigerant through the plurality of flow tubes, lines, and/or pipes (generally "fluid lines" or more simply "lines") forming the fluid loop may cause the fluid lines to vibrate. In some cases, vibrations of the fluid lines may be caused by the operation of other components of the climate control system (e.g., fans, motors, valves, etc.). Regardless of the source, the vibration of the refrigerant fluid lines within a climate control system can eventually lead to failures, potentially causing a leak of refrigerant.

BRIEF SUMMARY

Some embodiments disclosed herein are directed to climate control system. In an embodiment, the climate control system includes a compressor, a suction line coupled to an inlet of the compressor, and a discharge line coupled to the outlet of the compressor. In addition, the climate control system includes a pressure equalization valve (PEV) fluidly coupled to the inlet and the outlet. The pressure equalization valve comprises a PEV fluid line. Further, the climate control system includes a vibration damping clip engaged with each of the suction line, the discharge line, and the PEV fluid line.

In another embodiment, the climate control system includes a compressor, a suction line coupled to an inlet of the compressor, and a discharge line coupled to the outlet of the compressor. In addition, the climate control system includes a pressure equalization valve (PEV) configured to adjust a pressure differential between the inlet and the outlet. The pressure equalization valve comprises a housing and a PEV fluid line extending from the housing. Further, the climate control system includes a vibration damping clip engaged with each of the suction line, the discharge line, and the PEV fluid line along a single plane.

In still another embodiment, the climate control system includes a compressor, a suction line coupled to an inlet of the compressor, a discharge line coupled to the outlet of the compressor, and a pressure equalization valve (PEV) fluidly coupled to the inlet and the outlet. The pressure equalization valve comprises a PEV fluid line. In addition, the climate control system includes a vibration damping clip. The vibration damping clip includes a first receptacle engaged with the suction line, a second receptacle engaged with the discharge line, a third receptacle engaged with the PEV fluid line, and a frame connected to the first receptacle, the second receptacle, and the third receptacle. The first receptacle, the second receptacle, third receptacle, and the frame comprise a single-piece, monolithic body.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIG. 9 is a right side view of the vibration damping clip of FIGS. 5 and 6 according to some embodiments;

FIG. 10 is a left side view of the vibration damping clip of FIGS. 5 and 6 according to some embodiments;

DETAILED DESCRIPTION

Figure 1:
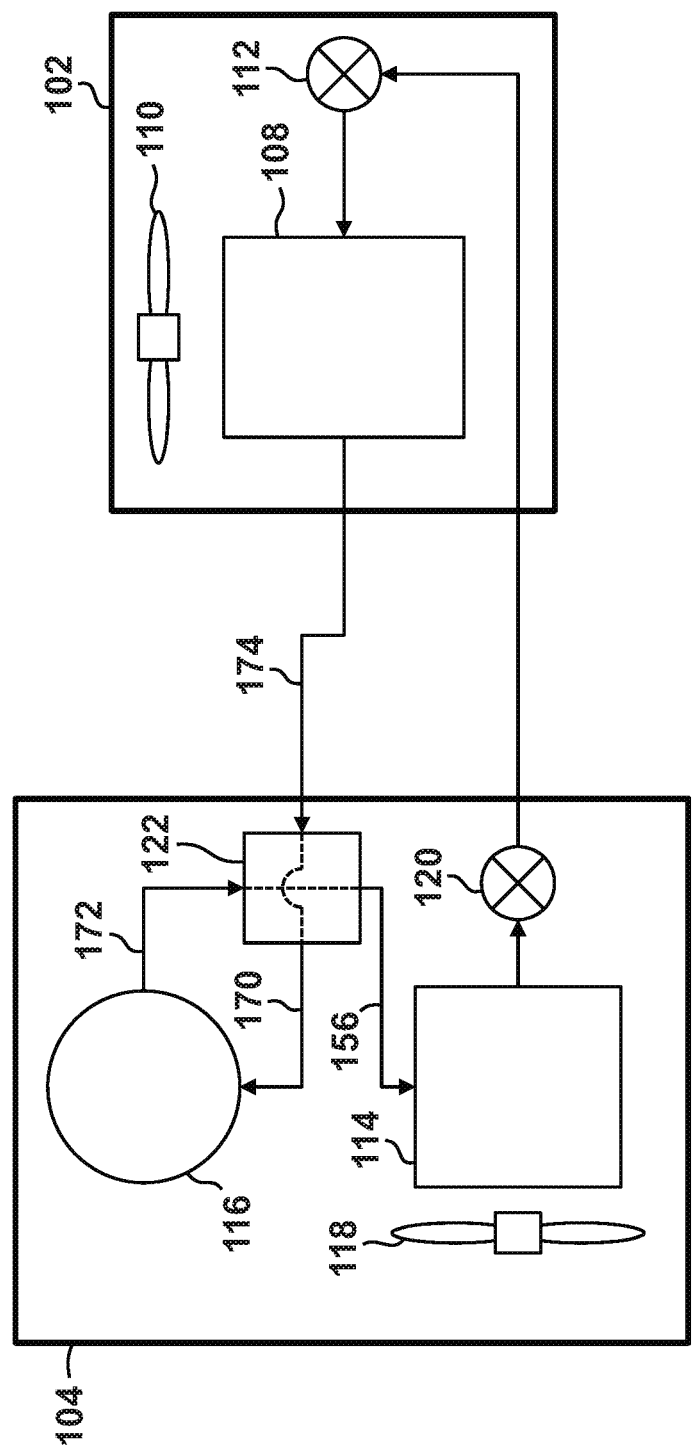
FIG. 1 is a diagram of a HVAC system configured for operating in a cooling mode according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As used herein, a climate control system generally refers to a device or system that is to exchange heat between a defined space or volume (e.g., a so-called "indoor space" such as the inside of a house, office, retail store, etc., or a volume of a container such as that defined within a refrigerator or freezer, etc.) and an environment outside of the indoor space (e.g., the outside area surrounding the indoor space), by the circulation of a refrigerant through a fluid loop. As previously described above, a climate control system may specifically include a HVAC system, a stand-alone air conditioning system, a heat pump system, a dehumidification system. In addition, in some embodiments, a climate control system may comprise a refrigeration system for cooling, or freezing a defined space or volume (e.g., such as a refrigeration system utilized within a refrigerator or freezer).

As previously described above, the fluid lines within a climate control system may be excited during operation by vibrations generated by a compressor, fan, or other components of the climate control system. This excitation of the fluid lines can lead to excessive vibration thereof. In some cases, the vibrations may result in damage to the fluid lines themselves (e.g., such as a leak or loss of refrigerant) and/or other components (e.g., of the climate control system) that are disposed adjacent to the vibrating fluid lines.

Accordingly, embodiments disclosed herein include vibration damping clips for reducing the vibrations of fluid lines within a climate control system so as to reduce such failures and increase a working life for the climate control system. In particular, in some embodiments, the vibration damping clips include three receptacles for engaging with three fluid lines of a climate control system. Without being limited to this or any other theory, a vibration damping clip that engages with only two spaced fluid lines may provide vibration damping along a single line, axis, or direction. By contrast, engaging three spaced fluid lines with a single vibration damping clip may provide for vibration damping in two orthogonal lines, axes, or directions. In other words, a vibration damping clip that engages with three fluid lines according to the embodiments disclosed herein may provide for vibration damping in a plane (e.g., a plane defined by the two orthogonal axes) rather than along a single direction or axis. As a result, the embodiments of vibration damping clips disclosed herein may provide enhanced vibration damping of fluid lines within a climate control system (e.g. such as within an outdoor unit of a climate control system) with a single component or part.

Referring now to FIG. 1, a schematic diagram of a climate control system 100 according to some embodiments is shown. In this embodiment, climate control system 100 is an HVAC system, and thus, system 100 may be referred to herein as HVAC system 100. In one embodiment, HVAC system 100 comprises a heat pump system that may be selectively operated to implement one or more substantially closed thermodynamic refrigeration cycles to provide a cooling functionality (hereinafter "cooling mode") and/or a heating functionality (hereinafter "heating mode") for an indoor space. The HVAC system 100, configured as a heat pump system, may comprise a split system having a first (e.g., indoor) unit 102, and a second (e.g., outdoor) unit 104.

Indoor unit 102 may comprise an air handling unit comprising an indoor heat exchanger 108, an indoor fan 110, and an indoor metering device 112. In some embodiments, one or more of the components of indoor unit 102 may be disposed within an indoor space (not shown); however, it should be appreciated that some or all of the components of indoor unit 102 may be disposed outside of indoor space, in which case the components thereof may not actually be indoors. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise a centrifugal blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of an indoor space. The indoor fan 110 may alternatively comprise a mixed-flow fan and/or any other suitable type of fan. The indoor fan 110 may generally be configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, however, the indoor fan 110 may be a single speed fan.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, and a reversing valve 122. In some embodiments, one or more of the components of outdoor unit 104 may be disposed outside of an indoor space (not shown); however, it should be appreciated that one or more of the components of outdoor unit 104 may be disposed (at least partially) within the indoor space. The outdoor heat exchanger 114 may generally be configured to promote heat transfer between a refrigerant carried within internal passages or tubing of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In some embodiments, however, the compressor 116 may comprise a modulating compressor that is capable of operation over a plurality of speed ranges, a reciprocating-type compressor, a single speed compressor, and/or any other suitable refrigerant compressor and/or refrigerant pump.

The outdoor fan 118 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the indoor heat exchanger 108. The outdoor fan 118 may generally be configured as a modulating and/or variable speed fan capable of being operated at a plurality of speeds over a plurality of speed ranges. In other embodiments, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, the outdoor fan 118 may be a single speed fan. Further, in other embodiments, the outdoor fan 118 may comprise a mixed-flow fan, a centrifugal blower, and/or any other suitable type of fan and/or blower.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. In some embodiments, while the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flow path of refrigerant through the reversing valve 122 and consequently the HVAC system 100.

As shown in FIG. 1, the HVAC system 100 is configured for operating in a so-called cooling mode in which heat may generally be absorbed by refrigerant at the indoor heat exchanger 108 and rejected from the refrigerant at the outdoor heat exchanger 114. Starting at the compressor 116, the compressor 116 may be operated to compress refrigerant and pump the relatively high temperature and high pressure compressed refrigerant through the reversing valve 122 and to the outdoor heat exchanger 114, where the refrigerant may transfer heat to an airflow that is passed through and/or into contact with the outdoor heat exchanger 114 by the outdoor fan 118. After exiting the outdoor heat exchanger 114, the refrigerant may flow through and/or bypass the outdoor metering device 120, such that refrigerant flow is not substantially restricted by the outdoor metering device 120. Refrigerant generally exits the outdoor metering device 120 and flows to the indoor metering device 112, which may meter the flow of refrigerant through the indoor metering device 112, such that the refrigerant downstream of the indoor metering device 112 is at a lower pressure than the refrigerant upstream of the indoor metering device 112. From the indoor metering device 112, the refrigerant may enter the indoor heat exchanger 108. As the refrigerant is passed through the indoor heat exchanger 108, heat may be transferred to the refrigerant from an airflow that is passed through and/or into contact with the indoor heat exchanger 108 by the indoor fan 110. Refrigerant leaving the indoor heat exchanger 108 may flow to the reversing valve 122, where the reversing valve 122 may be selectively configured to divert the refrigerant back to the compressor 116, where the refrigeration cycle may begin again.

Figure 2:
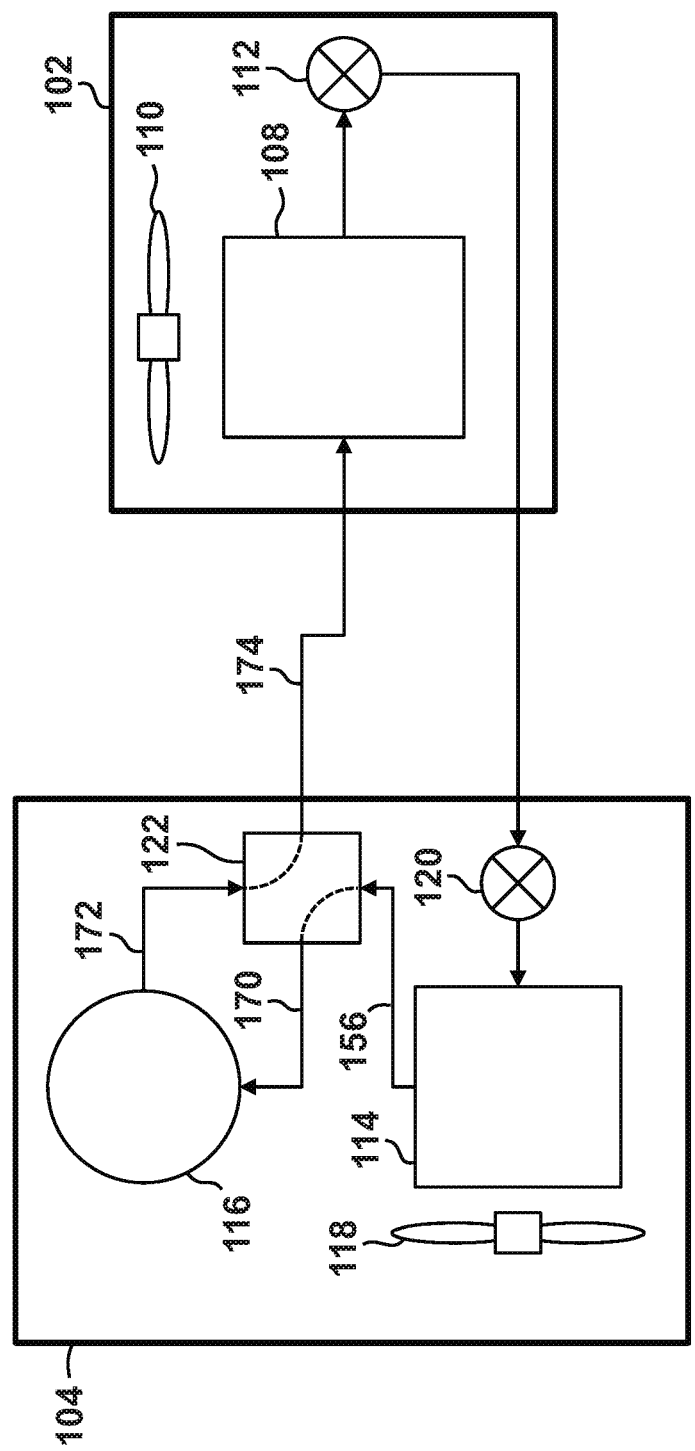
FIG. 2 is a diagram of the HVAC system of FIG. 1 configured for operating in a heating mode according to some embodiments.

Reference is now made to FIG. 2, which shows the HVAC system 100 configured for operating in a so-called heating mode. Most generally, the roles of the indoor heat exchanger 108 and the outdoor heat exchanger 114 are reversed as compared to their operation in the above-described cooling mode. For example, the reversing valve 122 may be controlled to alter the flow path of the refrigerant from the compressor 116 to the indoor heat exchanger 108 first and then to the outdoor heat exchanger 114, the outdoor metering device 120 may be enabled, and the indoor metering device 112 may be disabled and/or bypassed. In heating mode, heat may generally be absorbed by refrigerant at the outdoor heat exchanger 114 and rejected by the refrigerant at the indoor heat exchanger 108. As the refrigerant is passed through the outdoor heat exchanger 114, the outdoor fan 118 may be operated to move air into contact with the outdoor heat exchanger 114, thereby transferring heat to the refrigerant from the air surrounding the outdoor heat exchanger 114. Additionally, as refrigerant is passed through the indoor heat exchanger 108, the indoor fan 110 may be operated to move air into contact with the indoor heat exchanger 108, thereby transferring heat from the refrigerant to the air surrounding the indoor heat exchanger 108.

Figure 3:
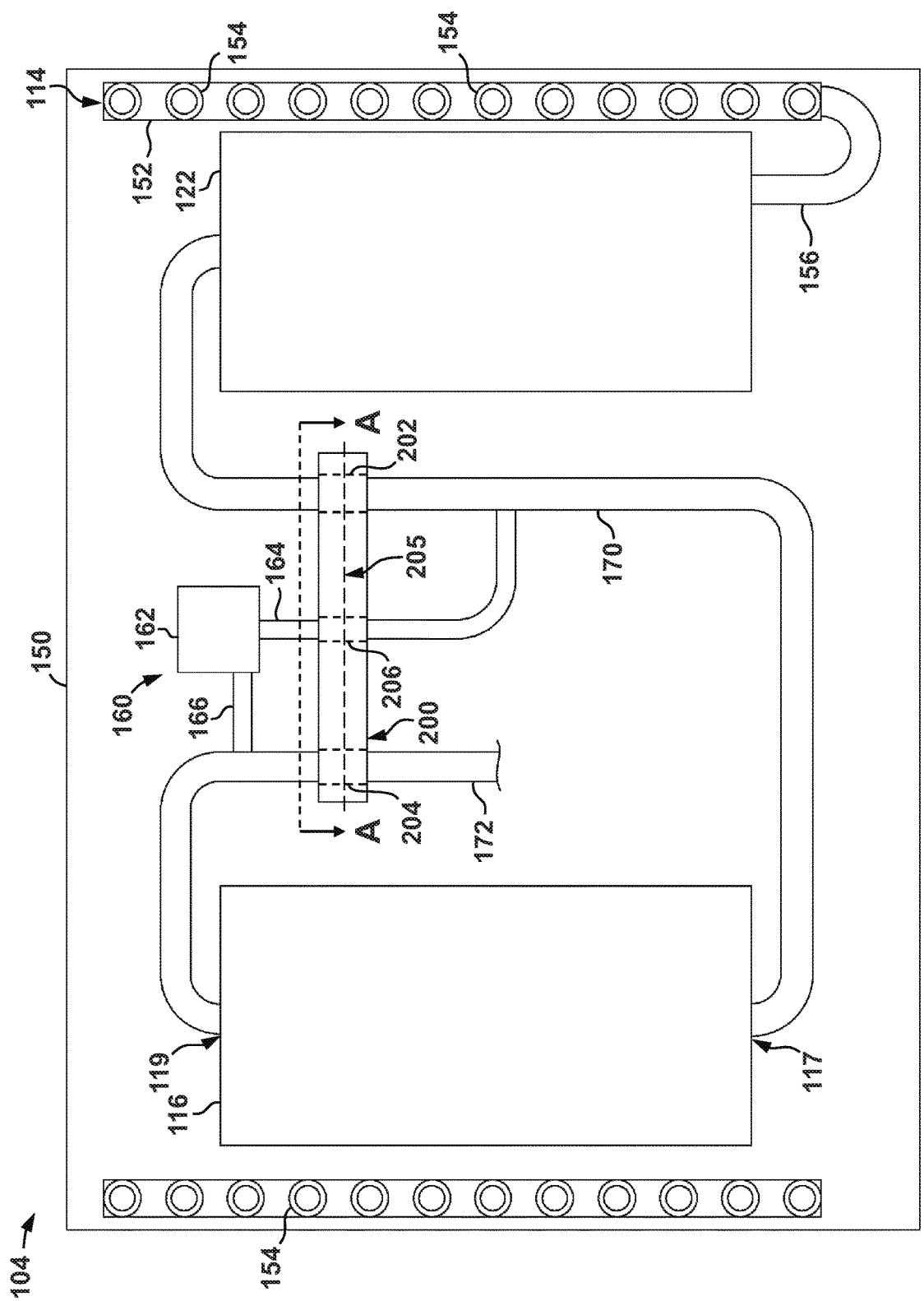
FIG. 3 is a partially schematic view of the outdoor unit of the HVAC system of FIG. 1 according to some embodiments.

Referring now to FIG. 3, a partially schematic layout of outdoor unit 104 of HVAC system 100 (see e.g., FIGS. 1 and 2) is shown. It should be appreciated that FIG. 3 does not depict all of the components of the outdoor unit 104, and may also schematically depict portions or parts of the outdoor unit 104 so as to simplify the figure and the discussion associated therewith. As shown in FIG. 3, outdoor unit 104 includes an outer housing 150 that encloses a coil assembly 152 of the outdoor heat exchanger 114. As generally described above, the coil assembly 152 comprises one or a plurality of tubes or coils 154 for circulating refrigerant therethrough. While not specifically shown in FIG. 3, as previously described above, outdoor fan 118 (see e.g., FIGS. 1 and 2) may generate an airflow across coil assembly 152 of outdoor heat exchanger 114 so as to transfer heat between the refrigerant flowing within coil(s) 154 and the environment surrounding outdoor unit 104.

Referring briefly now to FIGS. 1-3, a fluid line 156 fluidly couples the coil assembly 152 of outdoor heat exchanger 114 with the reversing valve 122. During operations, the fluid line 156 may comprise an outlet from the reversing valve 122 when the HVAC system 100 is operated in a cooling mode (FIG. 1) and may comprise an inlet to the reversing valve 122 when the HVAC system 100 is operated in the heating mode (FIG. 2). Referring again to FIG. 3, a suction line 170 extends from the reversing valve 122 to an inlet 117 of the compressor 116, and a discharge line 172 extends from an outlet 119 of the compressor 116. As previously described above, the discharge line 172 may be fluidly coupled to the reversing valve 122, and an additional fluid line 174 (see e.g., FIG. 1) may be fluidly coupled between the reversing valve 122 and the indoor heat exchanger 108. However, the fluid coupling between the discharge line 172 and reversing valve 122 as well as the additional fluid line 174 are not specifically shown in FIG. 3 so as to simplify the drawing.

Referring specifically again to FIG. 3, a pressure equalization valve (PEV) 160 is fluidly coupled between the inlet 117 and outlet 119 of compressor 116. Generally speaking, the pressure equalization valve 160 is configured to selectively adjust a pressure differential between the inlet 117 and outlet 119 during operations. For instance, during initial start-up of the outdoor unit 104 (e.g., such as at the beginning of a heating or cooling operation cycle), there may be a relatively large pressure differential between the inlet 117 and outlet 119 that may provide a resistance to the start-up and operation of compressor 116. Thus, during the initial start-up of compressor 116, PEV 160 may selectively reduce the pressure differential between the inlet 117 and outlet 119 so as to reduce the resistance or load on the compressor 116. In some cases, PEV 160 may selectively operate to equalize the pressures of inlet 117 and outlet 119 (i.e., such that the pressure differential between the inlet 117 and outlet 119 is zero or substantially zero). In other cases, PEV 160 may selectively operate to reduce the pressure differential between the inlet 117 and outlet 119 to a value that is greater than zero.

PEV 160 includes a housing 162, a first PEV fluid line 164 fluidly coupled between the suction line 170 and the housing 162, and a second PEV fluid line 166 fluidly coupled between the discharge line 172 and housing 162. Thus, PEV 160 is fluidly coupled to suction line 170 and discharge line 172 via fluid lines 164 and 166, respectively. Within housing 162, a controllable valving element (not shown) may selectively and controllably move so as to selectively allow or restrict fluid from flowing between the suction line 170 and discharge line 172 (thereby effectively bypassing the compressor 116) and adjust (e.g., decrease) the pressure differential between the inlet 117 and outlet 119 as previously described. In some embodiments, the controllable valving element (not shown) may comprise a valve member that controllably engages with a valve seat to admit, restrict, and/or adjust the fluid communication between first PEV fluid line 164 and second PEV fluid line 166 during operations. The position of the controllable valving element (not shown) may be adjusted via a control signal from one or a combination of the controllers of HVAC system 100 (not shown). In some embodiments, the first PEV fluid line 164 may be coupled directly to the inlet 117, and/or the second PEV fluid line 166 may be directly coupled to the outlet 119.

During the operation of outdoor unit 104 (e.g., such as during the operation of HVAC system 100 in the cooling mode or heating mode as previously described above), the compressor 116 may operate to compress the refrigerant and thereby induce the flow of the refrigerant through, among other things, the outdoor heat exchanger 114, reversing valve 122, and the fluid lines 156, 170, 172. During these operations, the controllable valving element (not shown) of PEV 160 may be shifted within the housing 162 so as to adjust a flow of refrigerant through the first PEV fluid line 164 and second PEV fluid line 166 as previously described. In addition, during these operations, the fluid lines 170, 172, 164, 166 may vibrate due to the operation of compressor 116 as well as the operation of other components within outdoor unit 104 (e.g., outdoor fan 118 in FIGS. 1 and 2). These vibrations may cause wear and eventually failure of one or more of the fluid lines 170, 172, 164, 166 so that a leak of refrigerant may result. In some instances, the relatively smaller diameter fluid lines, such as first PEV fluid line 164 and second PEV fluid line 166, may be the most vulnerable to the wear and failure risks noted above. In addition, without being limited to this or any other theory, the first PEV fluid line 164 may be relatively long (e.g., as compared to second PEV fluid line 166—see e.g., FIG. 3), and may provide at least some vertical support for the housing 162 of PEV valve 160. Thus, first PEV fluid line 164 may experience an elevated amount of excitation and vibration during operations as compared to other fluid lines within outdoor unit 104. Accordingly, as shown in FIG. 3, outdoor unit 104 also includes a vibration damping clip 200 coupled to each of the suction line 170, discharge line 172, and the first PEV fluid line 164 that is configured to stiffen each of the fluid lines 170, 172, 164 and thereby reduce vibrations experienced by these fluid lines 170, 172, 164 as well as components and other fluid lines coupled thereto during operations. It should be appreciated that vibration damping clip 200 may be coupled to other combinations of fluid lines within outdoor unit 104 in other embodiments.

As can be appreciated in FIG. 3, the vibration damping clip 200 is coupled to each of the fluid lines 170, 172, 164 along a single plane 205, and in this embodiment, the plane 205 extends substantially perpendicularly through each of the fluid lines 170, 172, 164. More specifically, the vibration damping clip 200 includes a first receptacle 202 that is to receive and engage with the suction line 170, a second receptacle 204 that is receive and engage with the discharge line 172, and a third receptacle 206 to receive and engage with the first PEV fluid line 164. The first receptacle 202, second receptacle 204, and third receptacle 206 are engaged with the suction line 170, discharge line 172, and first PEV fluid line 164 along the plane 205. Further structural and other details of embodiments of the vibration damping clip 200 are now described in more detail below; however, it should be noted that by engaging each of the parallel, spaced fluid lines 170, 172, 164, the vibration damping clip 100 may provide for vibration damping of the fluid lines 170, 172, 164 along a plane that is coincident or parallel to the plane 205.

Figure 4:
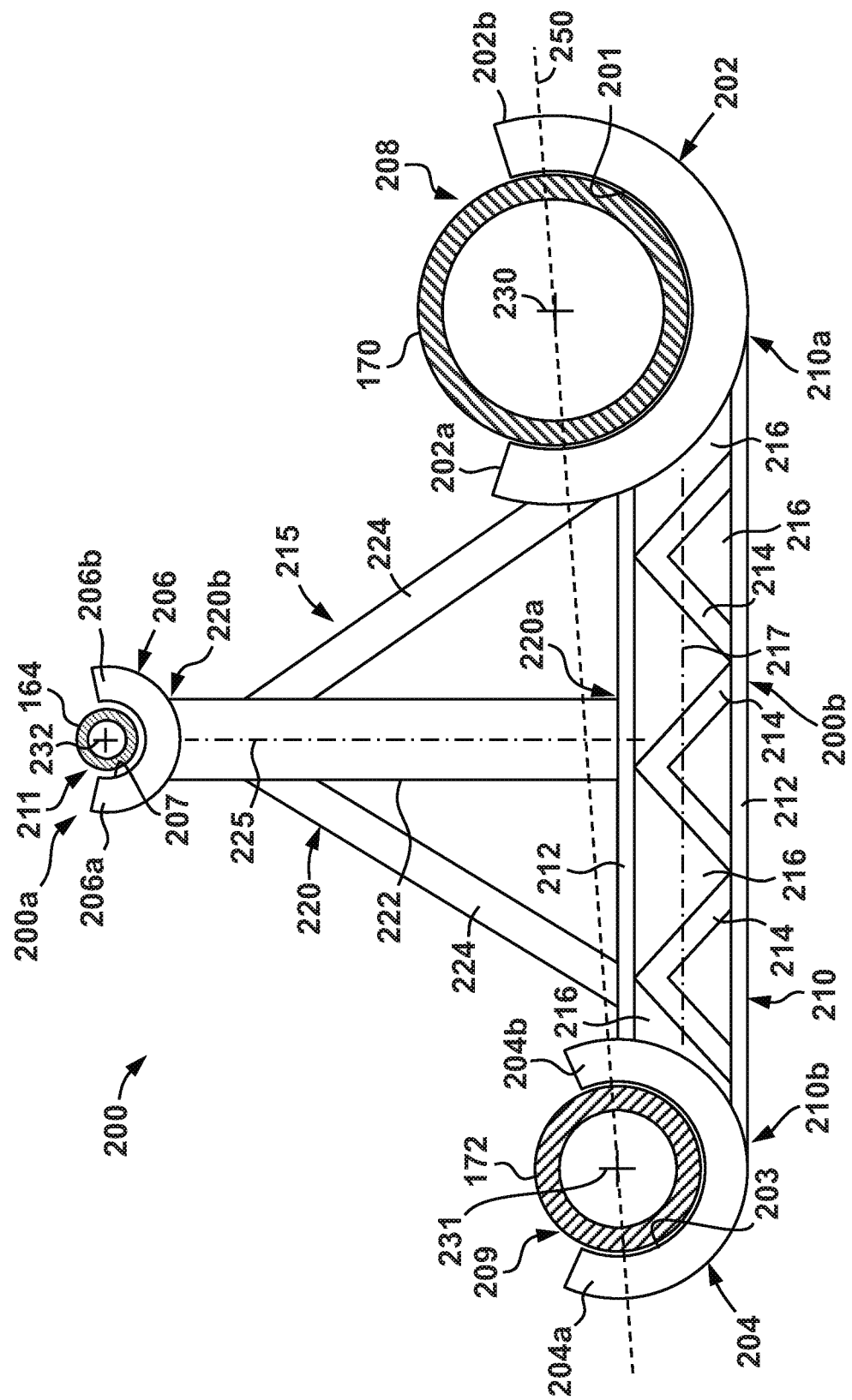
FIG. 4 is a schematic cross-sectional view taken along section A-A in FIG. 3 to show a vibration damping clip that may be utilized within the outdoor unit of FIG. 3 according to some embodiments.
Figure 5:
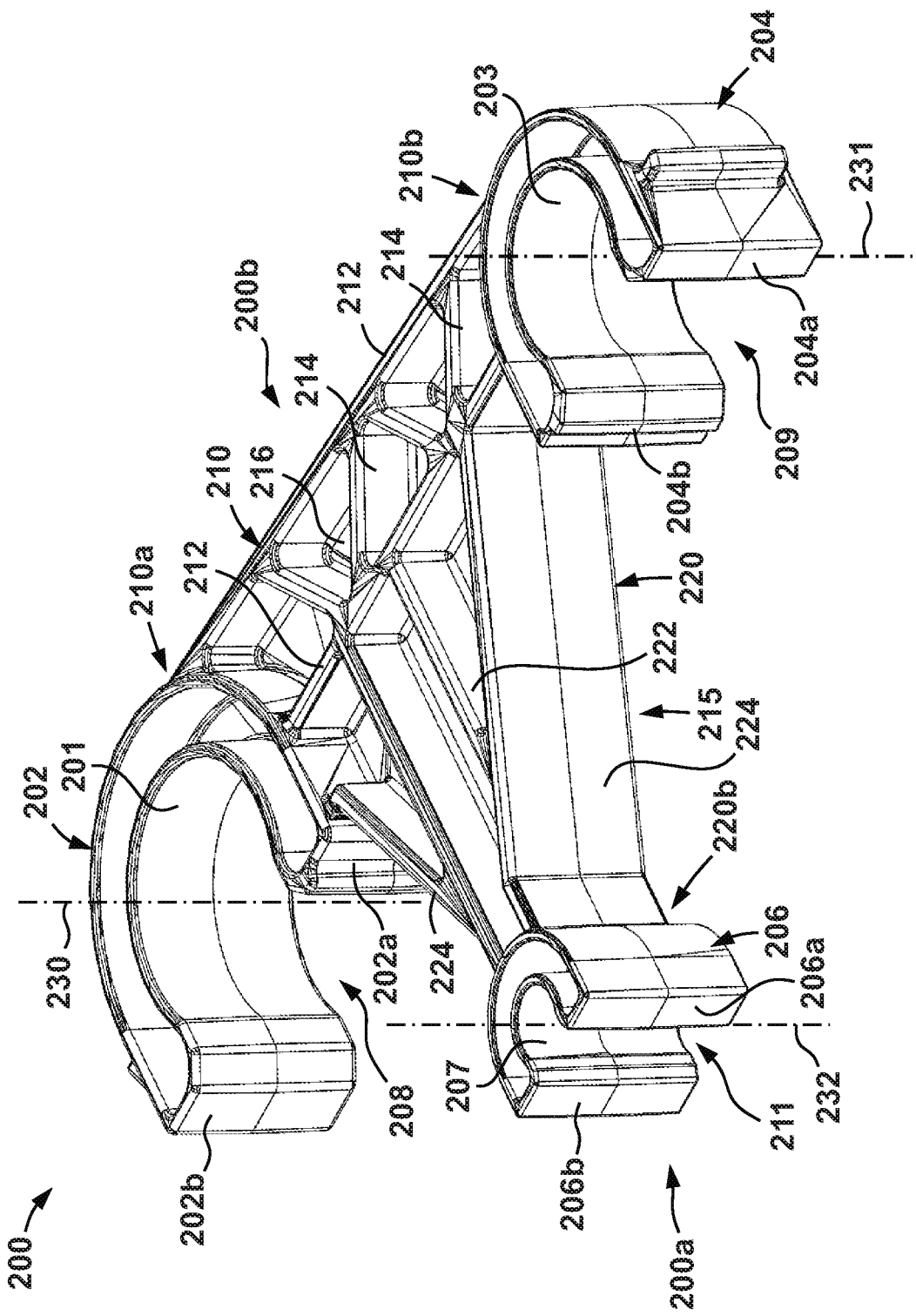
FIGS. 5 and 6 are perspective views of the vibration damping clip of FIG. 4 according to some embodiments.
Figure 6:
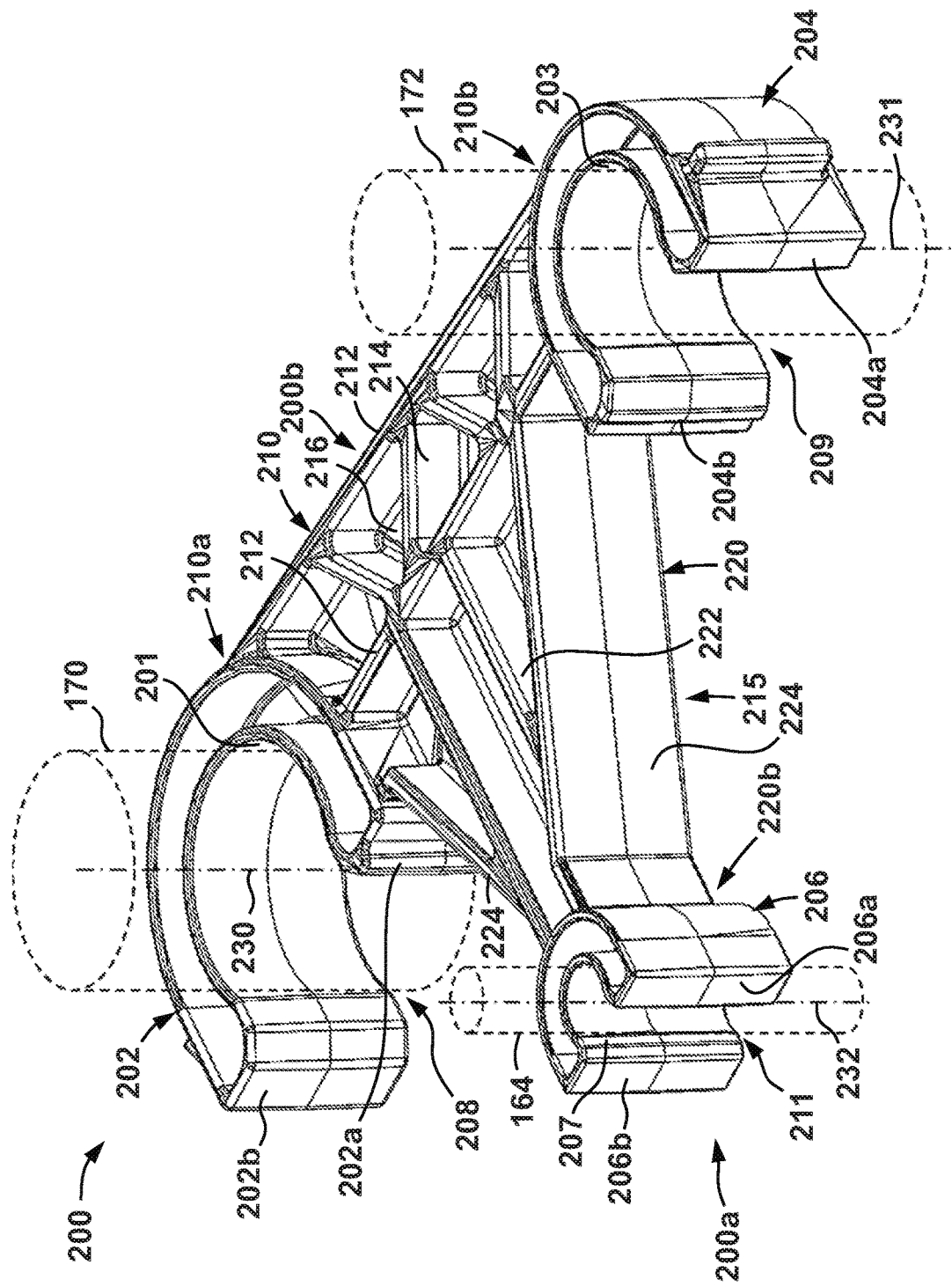
Figure 7:
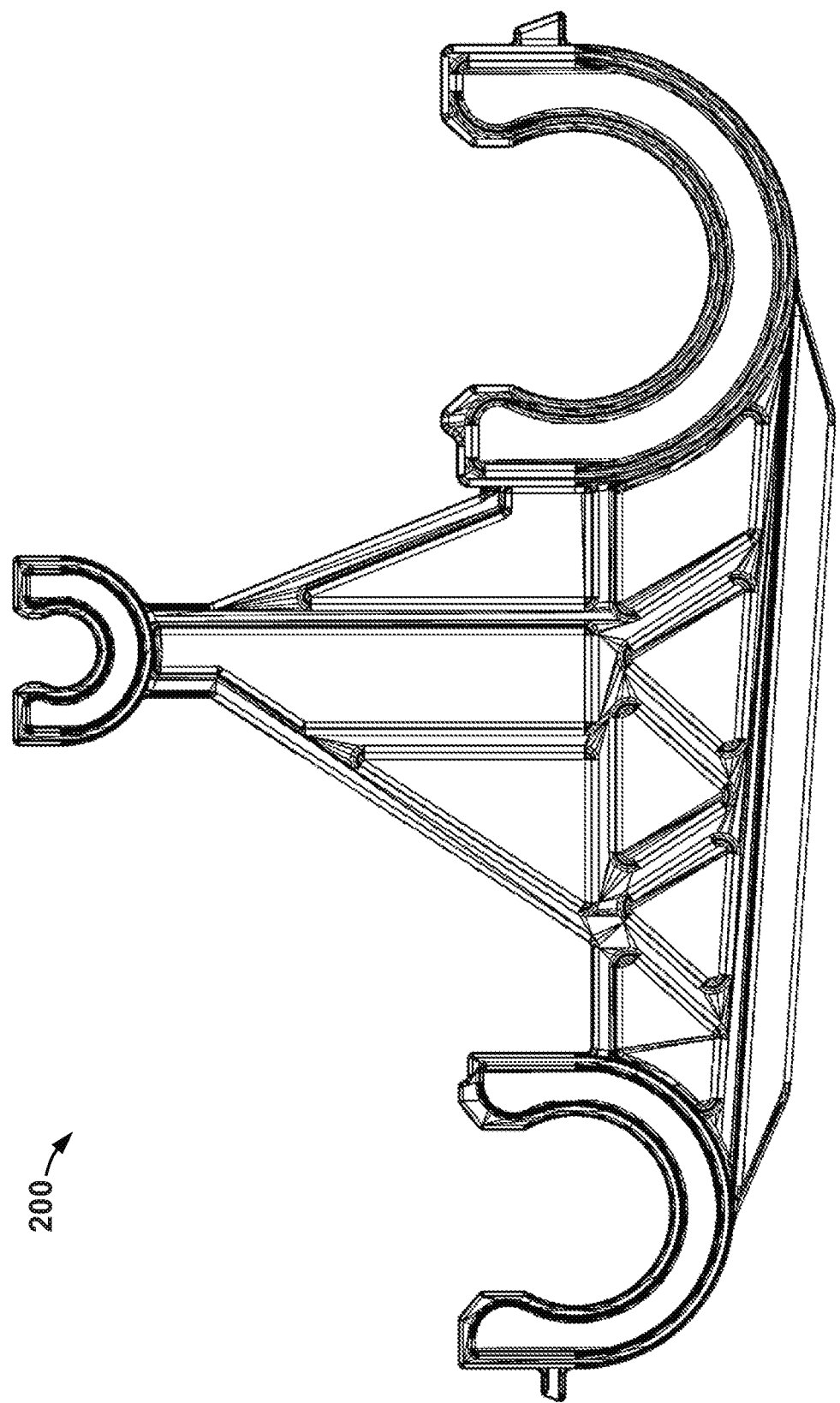
FIG. 7 is a top view of the vibration damping clip of FIGS. 5 and 6 according to some embodiments.
Figure 8:
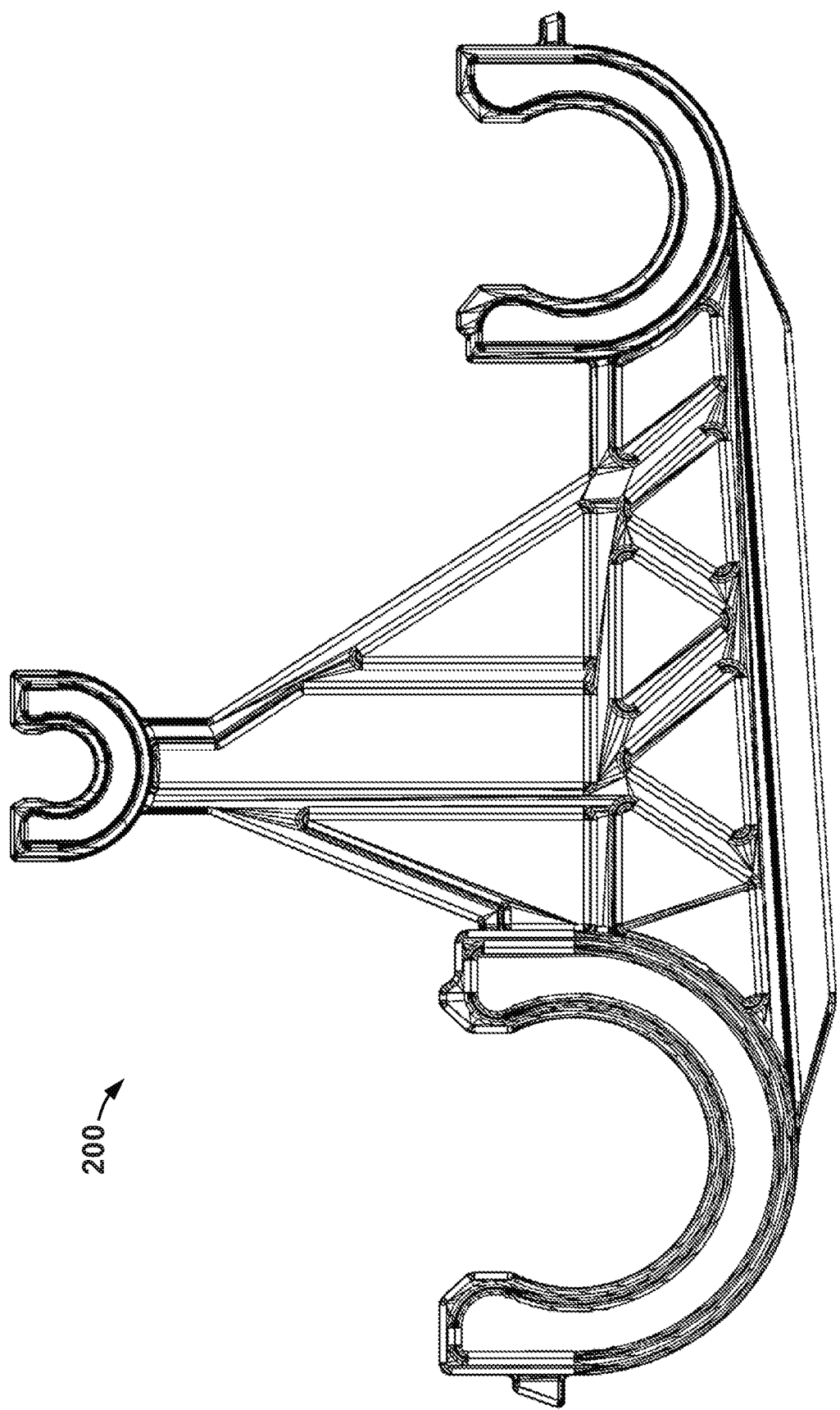
FIG. 8 is a bottom view of the vibration damping clip of FIGS. 5 and 6 according to some embodiments.
Figure 11:
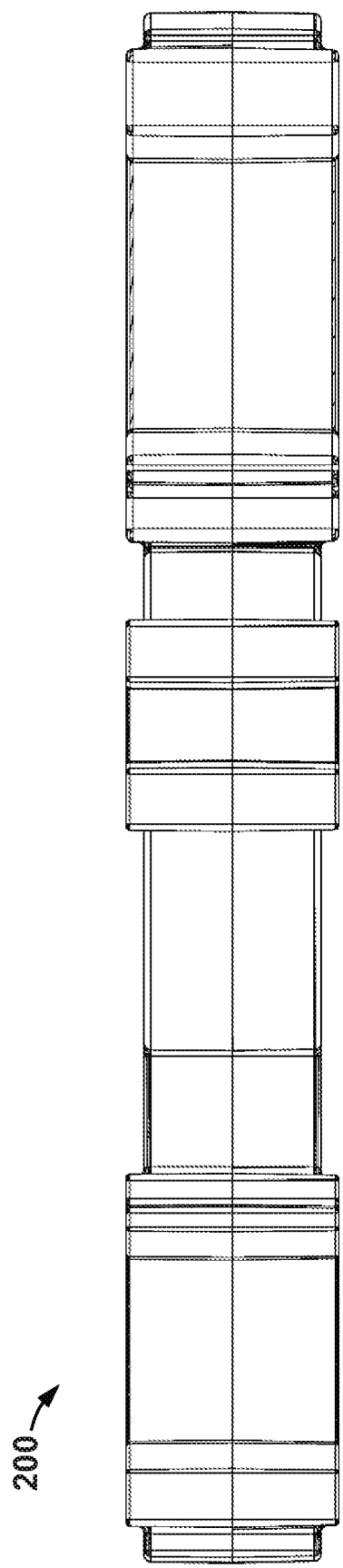
FIG. 11 is a front side view of the vibration damping clip of FIGS. 5 and 6 according to some embodiments.
Figure 12:
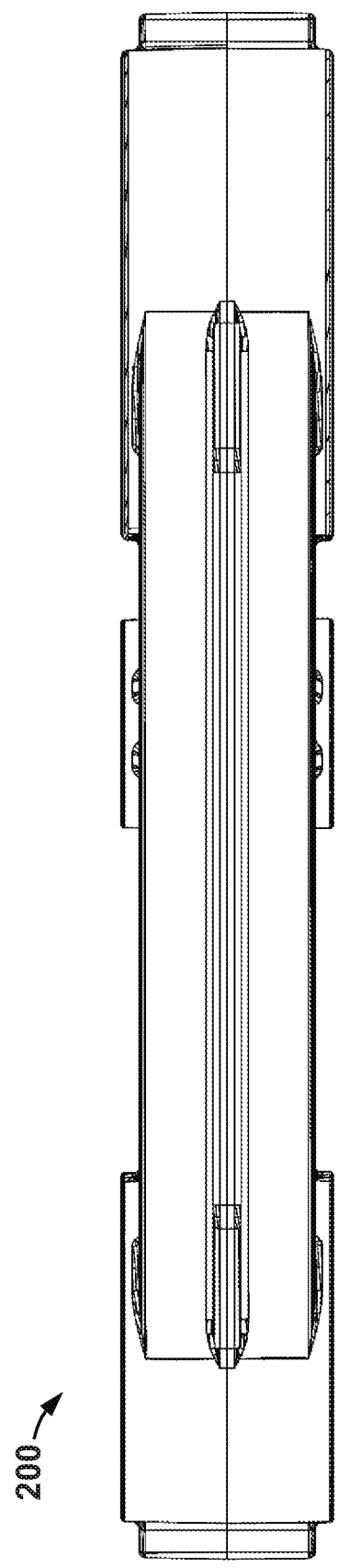
FIG. 12 is a back side view of the vibration damping clip of FIGS. 5 and 6 according to some embodiments.

Reference is now made to FIGS. 4-6, wherein FIG. 4 shows an embodiment of vibration damping clip 200 as seen at the cross-section A-A in FIG. 3, and FIGS. 5 and 6 show perspective views of the vibration damping clip 200 in FIG. 3. In addition, general reference is also made to FIGS. 7-12 which show various views of the vibration damping clip 200 of FIGS. 5 and 6. In some embodiments, the receptacles 202, 204, 206 are generally cylindrically shaped receptacles that are to receive the fluid lines 170, 172, 164, respectively, therein. Specifically, each of the receptacles 202, 204, 206 comprises a corresponding central axis 230, 231, 232, respectively. Each of the axes 230, 231, 232 are parallel and radially offset from one another, and each of the axes 230, 231, 232 extend perpendicularly through the plane 205 (see e.g., FIG. 3). The receptacles 202, 204, 206 each include a pair of arms 202a and 202b, 204a and 204b, 206a and 206b, respectively, which extend circumferentially about axes 230, 231, 232, respectively, and which define an inner cylindrical surface 201, 203, 207, respectively. The inner cylindrical surfaces 201, 203, 207 extend axially and circumferentially with respect to axes 230, 231, 232, respectively. In addition, each of the receptacles 202, 204, 206 define a radially extending opening or gap 208, 209, 211, respectively, between the arms 202a and 202b, 204a and 204b, 206a and 206b, respectively. The suction line 170 may be inserted radially into receptacle 202 via the opening 208 with respect to axis 230, the discharge line 172 may be inserted radially into receptacle 204 via the opening 209 with respect to axis 231, and the first PEV fluid line 164 may be inserted radially into receptacle 206 via the opening 211 with respect to axis 232. As best shown in FIGS. 4 and 6, once suction line 170, discharge line 172, and first PEV fluid line 164 are inserted within the receptacles 202, 204, and 206, respectively, the central axes 230, 231, 232 may be generally aligned with a longitudinal axis (not specifically shown) of the suction line 170, discharge line 172, first PEV fluid line 164, respectively within the receptacles 202, 204, 206, respectively.

The openings 208, 209, 211 may be smaller than the outer diameters of the fluid lines 170, 172, 164, respectively, such that when the fluid lines 170, 172, 164 are inserted radially into receptacles 202, 204, 206 (e.g., with respect to axes 230, 231, 232, respectively, as previously described) via openings 208, 209, 211, respectively, the arms 202a and 202b, 204a and 204b, 206a and 206b may be elastically displaced apart via the engagement with fluid lines 170, 172, 164 so as to widen the openings 208, 209, 211, respectively. Once fluid lines 170, 172, 164 are fully inserted within receptacles 202, 204, 206 (e.g., as shown in FIG. 4) the arms 202a and 202b, 204a and 204b, 206a and 206b elastically move back toward one another so that cylindrical surfaces 201, 203, 207 are engaged with an outer circumferential surface of fluid lines 170, 172, 164, respectively. In particular, in some embodiments, the arms 202a and 202b, 204a and 204b, 206a and 206b and cylindrical surfaces 201, 203, 207 of receptacles 202, 204, 206 may extend along a majority of the outer circumference of fluid lines 170, 172, 164, respectively (e.g., such as greater than 50%, 60%, 70%, 80%, etc. or more of the circumference), but less than all of the outer circumference of fluid lines 170, 172, 164 (e.g., less than 100% of the circumference) when fluid lines 170, 172, 164 are fully received within receptacle 202, 204, 206, respectively (e.g., as shown in FIG. 4).

In addition, as can be appreciated from FIG. 4, the receptacles 202, 204, 206 are not all aligned along a single line (see e.g., FIG. 4) extending parallel to or along the plane 205 (see e.g., FIG. 3). For instance, a line 250 (that extends parallel to or along the plane 205 of FIG. 3) connecting the axes 230, 231 of receptacles 202, 204, respectively, does not also pass through axis 232 of receptacle 206. Likewise, a line (not shown) that is parallel to or extends along plane 205 (e.g., line 205) connecting the axes 230, 232 of receptacles 202, 206, respectively, does not also pass through axis 231 of receptacle 204, and a line (not shown) that is parallel to or extends along plane 205 (e.g., line 250) connecting the axes 231, 232 of receptacles 204, 206, respectively, does not also pass through axis 230 of receptacle 202. In addition, the third receptacle 206 is disposed between the first receptacle 202 and the second receptacle 204 along the direction of the line 250.

Further, as shown in FIGS. 4-6, each of the openings 208, 211, 209 generally face the same direction along vibration damping clip 200. For instance, vibration damping clip 200 may generally include a first end 200a at third receptacle 206 and a second end 200b at first frame member 210, first receptacle 202, and second receptacle 204. The first end 200a may be axially opposite the second end 200b with respect to axis 225 of second frame member 220. In addition, the first end 200a may be disposed on a first radial side of axis 217 of first frame member 210, while the second end 200b may be disposed on a second, opposite radial side of axis 217. Thus, each of the openings 202, 204, 206 may generally face toward the first end 200a and generally away from the second end 200b. Specifically, each of the openings 202, 204, 206 may generally face toward the first end 200a, and away from the second end 200b in a radial direction with respect to axis 217 and in an axial direction with respect to axis 225.

Without being limited to this or any other theory, facing the openings 202, 204, 206 in the same direction as described above may allow the vibration damping clip 200 to be simultaneously (or substantially simultaneously) coupled to the suction line 170, discharge line 172, and first PEV fluid line 164 (e.g., via insertion of the suction line 170, discharge line 172, and first PEV fluid line 164 into the receptacles 202, 204, 206, respectively) by applying a force (in an axial direction with respect to axis 225 or radially with respect to axis 217) to the vibration damping clip 200 directed from the second end 200b to the first end 200a. As a result, the installation operations for the vibration damping clip 200 may be relatively simple, so as to reduce instances of improper installation or attachment of the vibration damping clip 200 to the suction line 170, discharge line 172, and first PEV fluid line 164. Similarly, the arrangement of the openings 202, 204, 206 may permit installation of the vibration damping clip 200 without requiring access to the lines 170, 172, 164 from multiple angles.

Referring still to FIGS. 4-6, vibration damping clip 200 includes a frame 215 that connects the first receptacle 202, second receptacle 204, and third receptacle 206 to one another. In some embodiments (e.g., such as the embodiment of FIG. 4), the frame 215 includes a first frame member 210 and a second frame member 220.

The first frame member 210 is engaged with and extends between the first receptacle 202 and the second receptacle 204. In particular, the first frame member 210 includes longitudinal axis 217, a first end 210a, and a second end 210b that is axially opposite the first end 210a. First end 210a is engaged with the first receptacle 202, and second end 210b is engaged with the second receptacle 204. In addition, first frame member 210 includes a pair of elongate frame elements 212 that extend axially between the first end 210a and second end 210b, and a plurality of cross-members 214 extending between the elongate frame elements 212 (e.g., at angles less than 90° relative to axis 217 in some embodiments), so as to impart stiffness and rigidity to the first frame member 210. The spaces 216 between the elongate frame elements 212 and cross-members 214 may be filled with material (e.g., the material(s) making up the rest of vibration damping clip 200) and/or may be free or any materials.

The second frame member 220 is engaged with and extends between the first frame member 210 and the third receptacle 206. In particular, the second frame member 220 includes a longitudinal axis 225, a first end 220a, and a second end 220b that is axially opposite the first end 220a. First end 220a is engaged with the first frame member 210, and second end 220b is engaged with the third receptacle 206. In addition, in some embodiments (e.g., such as the embodiment shown in FIG. 4), the longitudinal axis 225 of second frame member 220 may extend perpendicularly or orthogonally to the longitudinal axis 217 of first frame member 210, so that the second frame member 220 perpendicularly extends to the first frame member 210. Also, in some embodiments, the longitudinal axes 217, 225 may both lie within the plane 205 shown in FIG. 3 (and thus, the axes 217, 225 may define the plane 205). Thus, the central axis 232 of the third receptacle 206 is disposed between the first receptacle 202 and the second receptacle 204 along the direction of the longitudinal axis 225 of second frame member 220.

Further, second frame member 220 includes an elongate frame element 222 that extends axially between the first end 220a and second end 220b. In particular, the elongate frame element 222 may be engaged with the third receptacle 206 and one of the elongate frame elements 212 of first frame member 210. In some embodiments, a pair of angled support members 224 are engaged between the elongate frame element 222 and the elongate frame element 212 of first frame member 210 that is engaged with frame element 222.

In some embodiments, the receptacles 202, 204, 206 and frame 215 of vibration damping clip 200 may be formed as a single-piece, monolithic body. Thus, in some embodiments, the receptacles 202, 204, 206 and frame 215 may be formed of the same material(s). In some embodiments, the vibration damping clip 200 (including the receptacles 202, 204, 206 and frame 215) may be formed from a molding process (e.g., compression molding, blow molding, injection molding, or a combination thereof). In some embodiments, the vibration damping clip 200 may comprise a polymer material (e.g., nylon). However, other materials may be utilized to construct vibration damping clip 200 (or one or more parts thereof) in other embodiments, such as, for instance glass embedded polymer composites, rubber, etc.

Referring now to FIGS. 3-6, during operations, the fluids lines 170, 172, 164 are coupled to the receptacles 202, 204, 206 as previously described above. Thereafter, during operations with outdoor unit 104, vibrations may be transferred to the fluid lines 170, 172, 164 as is also previously described above. However, the vibration damping clip 200 may increase a stiffness of the fluid lines 170, 172, 164 along the direction of plane 205 so that vibrations of fluid lines 170, 172, 164 along the direction of plane 205 are reduced. As a result, the vibration induced wear (e.g., fatigue) of the fluid lines 170, 172, 164 may be reduced so that the operating life of these fluid lines 170, 172, 164 and the outdoor unit 104 more generally may be increased. In some embodiments, vibration damping clip 200 may have a greater stiffness along the plane 205 than in other directions, such as, for instance, in directions that are perpendicular to the plane 205.

Figure 13:
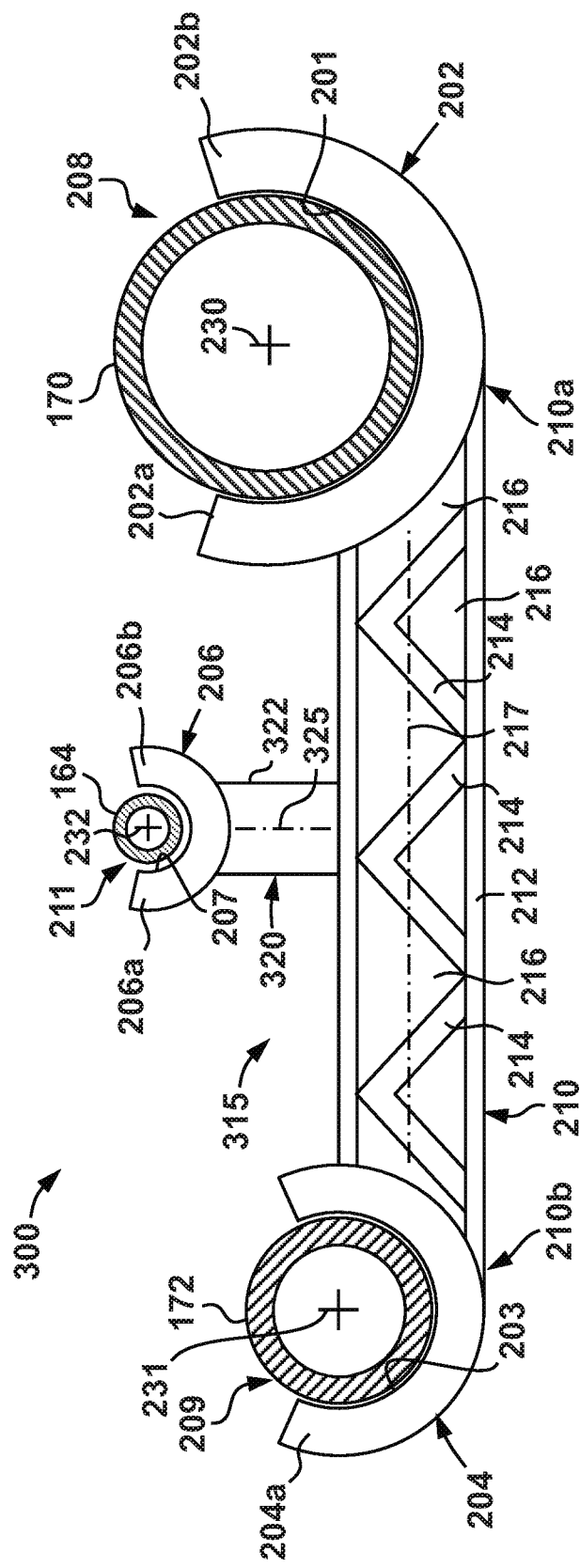
FIG. 13 is a schematic cross-sectional view taken along section A-A in FIG. 3 to show another vibration damping clip that may be utilized within the outdoor unit of FIG. 3 according to some embodiments.
Figure 14:
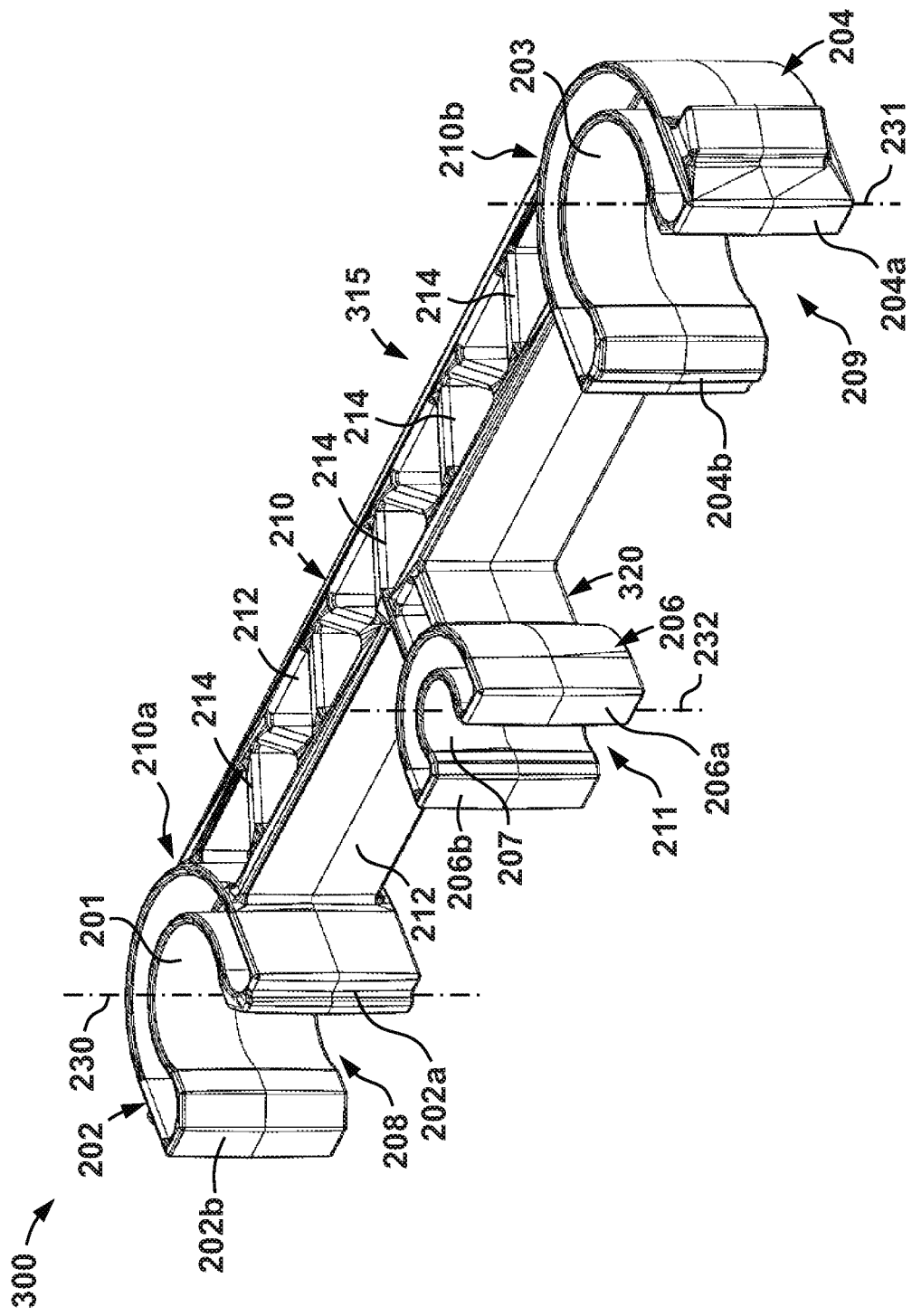
FIG. 14 is a perspective view of the vibration damping clip of FIG. 7 according to some embodiments.

Referring now to FIGS. 13 and 14, an embodiment of a vibration damping clip 300 is shown that may be used in place of vibration damping clip 200. In describing the features of vibration damping clip 300, the same reference numerals may be used to describe and indicate components of vibration damping clip 300 that are shared with vibration damping clip 200. In addition, the description below will focus on the features of vibration damping clip 300 that are different from vibration damping clip 200.

The vibration damping clip 300 includes receptacles 202, 204, 206 that are connected to one another via a frame 315 (in place of frame 215). The frame 315 includes first frame member 210, and includes a second frame member 320 in place of second frame member 220. The second frame member 320 includes a longitudinal axis 325 and an elongate frame element 322. Generally speaking, the elongate frame element 322 is the same as elongate frame element 222 of second frame member 220 in FIGS. 4-6, except that the elongate frame element 322 is generally shorter in length (e.g., along axis 325) than elongate frame member 222. Thus, the third receptacle 206 is generally closer in proximity to the first receptacle 202 and second receptacle 204 on the vibration damping clip 300 than the vibration damping clip 200. In addition, in this embodiment, the angled support members 224 shown in FIGS. 4-6, are omitted on the vibration damping clip 300. Without being limited to this or any other theory, the relatively shorter elongate frame member 322 may have a higher stiffness (e.g., relative to the first frame member 210) than the elongate frame member 222 shown in FIGS. 4-6, so that the angled support members 224 may be omitted as shown in FIG. 5. Of course, in some embodiments, the vibration damping clip 300 may generally include the angled support members 224.

Embodiments disclosed herein include vibration damping clips for reducing the vibrations of fluid lines within a climate control system. In particular, some of the disclosed embodiments may include vibration damping clips for engaging with three or more fluid lines within a climate control system so as to provide enhanced stiffness for the fluid lines along a plane, rather than along a single axis or direction. As a result, through use of the disclosed embodiments, vibration-induced wear of the fluid lines and other components within the climate control system (e.g., such as within the outdoor unit of a climate control system) may be reduced so as to increase the overall operational life of the system.

While exemplary embodiments have been shown and described, modifications thereof can be made by one skilled in the art without departing from the scope or teachings herein. For instance, in some embodiments, a vibration damping clip may include less than three receptacles (e.g., receptacles 202, 204, 206), such as, for instance, two receptacles (e.g., any two of the receptacles 202, 204, 206 shown in FIG. 4). The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A climate control system, the system comprising:
a compressor;
a suction line coupled to an inlet of the compressor;
a discharge line coupled to an outlet of the compressor;
a pressure equalization valve (PEV) fluidly coupled to the inlet and the outlet, wherein the pressure equalization valve comprises a PEV fluid line; and
a vibration damping clip engaged with each of the suction line, the discharge line, and the PEV fluid line,
wherein the vibration damping clip comprises a first receptacle, a second receptacle, and a third receptacle, wherein the first receptacle, the second receptacle, and the third receptacle each comprise a respective central axis and a respective opening extending radially with respect to the corresponding central axis,
wherein the openings for the first receptacle, the second receptacle, and the third receptacle are each directed in a first direction, the first direction orienting the openings in the same direction such that each opening faces a common end of the vibration damping clip and each opening is configured to couple to one of the suction line, the discharge line, and the PEV fluid line from the first direction,
wherein the central axis for the first receptacle, the central axis for the second receptacle, and the central axis for the third receptacle are all perpendicular to a first plane,
wherein a first line extends between the central axis for the first receptacle and the central axis for the second receptacle and in a direction parallel to the first plane, and the central axis for the third receptacle is not aligned with the first line,
wherein the first receptacle is configured to couple the suction line, the second receptacle is configured to couple the discharge line, and the third receptacle is configured to couple the PEV fluid line.

2. The climate control system of claim 1, wherein the vibration damping clip comprises a single-piece monolithic body.

3. The climate control system of claim 2, wherein the suction line is received within the first receptacle, the discharge line is received within the second receptacle, and the PEV fluid line is received within the third receptacle.

4. The climate control system of claim 1, wherein the first plane passes perpendicularly through the suction line, the discharge line, and the PEV fluid line.

5. The climate control system of claim 1, wherein the vibration damping clip includes a frame connecting the first receptacle, the second receptacle, and the third receptacle to one another, wherein the frame comprises:
a first frame member extending between the first receptacle and the second receptacle; and
a second frame member extending from the third receptacle to the first frame member.

6. The climate control system of claim 1, wherein the opening of the first receptacle, the opening of the second receptacle, and the opening of the third receptacle all face the same direction.

7. An outdoor unit of a climate control system, the outdoor unit comprising:
a compressor;
a suction line coupled to an inlet of the compressor;
a discharge line coupled to an outlet of the compressor;
a pressure equalization valve (PEV) configured to adjust a pressure differential between the inlet and the outlet, wherein the pressure equalization valve comprises a housing and a PEV fluid line extending from the housing; and
a vibration damping clip engaged with each of the suction line, the discharge line, and the PEV fluid line along a first plane,
wherein the vibration damping clip comprises a first receptacle, a second receptacle, and a third receptacle, wherein the first receptacle, the second receptacle, and the third receptacle each comprise a respective central axis and a respective opening extending radially with respect to the corresponding central axis,
wherein the openings for the first receptacle, the second receptacle, and the third receptacle are each directed in a first direction, the first direction orienting the openings in the same direction such that each opening faces a common end of the vibration damping clip and each opening is configured to couple to one of the suction line, the discharge line, and the PEV fluid line from the first direction,
wherein the central axis for the first receptacle, the central axis for the second receptacle, and the central axis for the third receptacle are all perpendicular to the first plane,
wherein a first line extends between the central axis for the first receptacle and the central axis for the second receptacle and in a direction parallel to the first plane, and the central axis for the third receptacle is not aligned with the first line,
wherein the first receptacle is configured to couple the suction line, the second receptacle is configured to couple the discharge line, and the third receptacle is configured to couple the PEV fluid line.

8. The outdoor unit of claim 7, wherein the suction line is received within the first receptacle, the discharge line is received within the second receptacle, and the PEV fluid line is received within the third receptacle.

9. The outdoor unit of claim 7, wherein the opening of the first receptacle, the opening of the second receptacle, and the opening of the third receptacle all face the same direction.

10. The outdoor unit of claim 7, wherein the first plane passes perpendicularly through the suction line, the discharge line, and the PEV fluid line.

11. The outdoor unit of claim 7, wherein the vibration damping clip includes a frame connecting the first receptacle, the second receptacle, and the third receptacle to one another, wherein the frame comprises:
a first frame member extending between the first receptacle and the second receptacle; and
a second frame member extending from the third receptacle to the first frame member.

12. The outdoor unit of claim 11, wherein the first frame member and the second frame member are parallel with or extend along the first plane.

13. The outdoor unit of claim 11, wherein the first frame member, the second frame member, the first receptacle, the second receptacle, and the third receptacle of the vibration damping clip comprise a single-piece monolithic body.

14. The outdoor unit of claim 7, wherein the central axis of the third receptacle is offset from the first line, and wherein the third receptacle is disposed between the first receptacle and the second receptacle with respect to a direction of the first line.

15. A climate control system, the system comprising:
a compressor;
a suction line coupled to an inlet of the compressor;
a discharge line coupled to an outlet of the compressor;
a pressure equalization valve (PEV) fluidly coupled to the inlet and the outlet, wherein the pressure equalization valve comprises a PEV fluid line; and
a vibration damping clip comprising:
a first receptacle engaged with the suction line;
a second receptacle engaged with the discharge line;
a third receptacle engaged with the PEV fluid line; and
a frame connected to the first receptacle, the second receptacle, and the third receptacle,
wherein the first receptacle, the second receptacle, the third receptacle, and the frame comprise a single-piece, monolithic body,
wherein the first receptacle, the second receptacle, and the third receptacle each comprise a respective central axis and a respective opening extending radially with respect to the corresponding central axis,
wherein the openings for the first receptacle, the second receptacle, and the third receptacle are each directed in a first direction, the first direction orienting the openings in the same direction such that each opening faces a common end of the vibration damping clip and each opening is configured to couple to one of the suction line, the discharge line, and the PEV fluid line from the first direction,
wherein the central axis for the first receptacle, the central axis for the second receptacle, and the central axis for the third receptacle are all perpendicular to a first plane,
wherein a first line extends between the central axis for the first receptacle and the central axis for the second receptacle and in a direction parallel to the first plane, and the central axis for the third receptacle is not aligned with the first line,
wherein the first receptacle is configured to couple the suction line, the second receptacle is configured to couple the discharge line, and the third receptacle is configured to couple the PEV fluid line.

16. The climate control system of claim 15, wherein the first receptacle, the second receptacle, and the third receptacle, each comprise an open cylindrical receptacle.

17. The climate control system of claim 15, wherein the frame comprises:
a first frame member extending between the first receptacle and the second receptacle; and
a second frame member extending from the third receptacle to the first frame member in a direction that is perpendicular to the first frame member.

* * * * *